(12) United States Patent
Rosinski et al.

(10) Patent No.: US 11,841,063 B2
(45) Date of Patent: Dec. 12, 2023

(54) CIRCULAR FORCE GENERATOR HAVING A SELF-CONTAINED POSITIONING SENSOR ASSEMBLY

(71) Applicant: GHSP, Inc., Grand Haven, MI (US)

(72) Inventors: Ryan David Rosinski, Whitehall, MI (US); Larry Duane Ridge, Whitehall, MI (US); Joseph Daniel Suchecki, Grand Haven, MI (US)

(73) Assignee: GHSP, Inc., Holland, MI (US)

( * ) Notice: Subject to any disclaimer, the term of this patent is extended or adjusted under 35 U.S.C. 154(b) by 769 days.

(21) Appl. No.: 16/919,249

(22) Filed: Jul. 2, 2020

(65) Prior Publication Data

US 2021/0048089 A1 Feb. 18, 2021

Related U.S. Application Data

(60) Provisional application No. 62/887,798, filed on Aug. 16, 2019.

(51) Int. Cl.
| | |
|---|---|
| *F16F 15/36* | (2006.01) |
| *G01D 5/14* | (2006.01) |
| *G01H 1/00* | (2006.01) |
| *G01M 1/36* | (2006.01) |
| *F16F 15/02* | (2006.01) |
| *G01D 11/24* | (2006.01) |

(52) U.S. Cl.
CPC ............. *F16F 15/36* (2013.01); *F16F 15/02* (2013.01); *G01D 5/145* (2013.01); *G01D 11/245* (2013.01); *G01H 1/003* (2013.01); *G01M 1/36* (2013.01)

(58) Field of Classification Search
CPC .......... F16F 15/36; F16F 15/02; G01D 5/145; G01D 11/245; G01H 1/003; G01M 1/36
USPC ......................................................... 464/180
See application file for complete search history.

(56) References Cited

U.S. PATENT DOCUMENTS

| | | | |
|---|---|---|---|
| 6,211,591 B1 | 4/2001 | Kowalski et al. | |
| 7,448,854 B2 | 11/2008 | Jolly et al. | |
| 2005/0122073 A1 | 6/2005 | Mullin et al. | |
| 2006/0083617 A1 | 4/2006 | Jolly et al. | |
| 2011/0233364 A1* | 9/2011 | Breen .................... | F16F 15/03 318/560 |
| 2012/0262095 A1 | 10/2012 | Smith et al. | |

(Continued)

FOREIGN PATENT DOCUMENTS

| | | |
|---|---|---|
| CN | 1373546 A | 10/2002 |
| CN | 101888136 A | 11/2010 |

(Continued)

*Primary Examiner* — Mahmoud Gimie
(74) *Attorney, Agent, or Firm* — Price Heneveld, LLP

(57) ABSTRACT

A vibration-cancelling module includes a first rotor having a first eccentric body, a second rotor having a second eccentric body, and a stator assembly in electromagnetic communication with the first and second rotors. A central shaft extends between the first and second rotors. The first and second rotors rotationally operate about a common rotational axis with respect to one another between a balanced position and a plurality of eccentric positions. A controller has an accelerometer assembly and a rotor-position sensor assembly. The controller delivers an electrical current to the stator assembly at least based upon the accelerometer assembly. A common housing contains the first and second rotors, the stator assembly, the central shaft and the controller.

20 Claims, 18 Drawing Sheets

(56) References Cited

U.S. PATENT DOCUMENTS

| | | | |
|---|---|---|---|
| 2016/0036366 A1* | 2/2016 | Yang | H02P 25/098 |
| | | | 310/46 |
| 2018/0006539 A1* | 1/2018 | Sanders | H02K 7/09 |
| 2018/0283493 A1 | 10/2018 | Six et al. | |
| 2020/0036299 A1* | 1/2020 | Ludois | H02N 1/08 |

FOREIGN PATENT DOCUMENTS

| | | | |
|---|---|---|---|
| CN | 107148723 A | 11/2015 | |
| CN | 105790492 A | 7/2016 | |
| CN | 109075687 A | 12/2018 | |
| EP | 1542340 A2 | 6/2005 | |
| JP | H09247910 A | 9/1997 | |
| RU | 1807837 | 7/1995 | |
| WO | WO-2020014299 A1 * | 1/2020 | H02K 1/182 |

* cited by examiner

CIRCULAR FORCE GENERATOR HAVING A SELF-CONTAINED POSITIONING SENSOR ASSEMBLY

CROSS-REFERENCE TO RELATED APPLICATION

This application claims priority to and the benefit under 35 U.S.C. § 119(e) of U.S. Provisional Patent Application No. 62/887,798, filed on Aug. 16, 2019 entitled CIRCULAR FORCE GENERATOR HAVING A SELF-CONTAINED POSITIONING SENSOR ASSEMBLY, the entire disclosure of which is hereby incorporated herein by reference.

FIELD OF THE INVENTION

The present invention generally relates to electric motors, and more specifically, a circular force generator having a housing with a rotor-position sensor assembly contained therein.

BACKGROUND OF THE INVENTION

A circular force generator assembly is a mechanism that generates various forces based on a speed and eccentric mass of a rotor assembly. Two or more of these mechanisms can be used together to generate a linear force in various directions that are perpendicular to the axis of rotation of the rotor assembly. These perpendicularly directed linear forces are typically used to cancel out unwanted vibrations within various machines.

SUMMARY OF THE INVENTION

According to one aspect of the present invention, a vibration-cancelling module includes a first rotor having a first eccentric body, a second rotor having a second eccentric body, and a stator assembly in electromagnetic communication with the first and second rotors. A central shaft extends between the first and second rotors. The first and second rotors rotationally operate about a common rotational axis with respect to one another between a balanced position and a plurality of eccentric positions. A controller has an accelerometer assembly and a rotor-position sensor assembly. The controller delivers an electrical current to the stator assembly at least based upon the accelerometer assembly. A common housing contains the first and second rotors, the stator assembly, the central shaft and the controller.

According to another aspect of the present invention, an anti-vibration module having integrated electronic controls includes at least two motors positioned within a housing and having respective rotor masses. The at least two motors selectively operate to define radial speed offsets that further define a counterbalance. An integral controller is positioned within the housing and is in operational communication with the at least two motors. The controller includes an imbalance accelerometer that senses vibrational inputs from a source to be counteracted and a rotor position assembly that monitors rotation of the at least two motors and cooperates with the controller and the imbalance accelerometer to define the radial speed offsets of the respective rotor masses. The at least two motors selectively operate in cooperation with the rotor position assembly and the imbalance accelerometer to define the counterbalance.

According to another aspect of the present invention, a vibration-cancelling module includes a first motor positioned within a common housing and having a first eccentric body. A second motor is positioned within the common housing and has a second eccentric body. The first and second motors selectively operate to define a vibration cancelling force. A controller has an accelerometer assembly and a rotor position sensor assembly positioned on a printed circuit board. The controller and the printed circuit board are each positioned within the common housing. The controller delivers an electrical current to a stator assembly at least based upon the accelerometer assembly and the rotor position sensor assembly to define the vibration canceling force.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
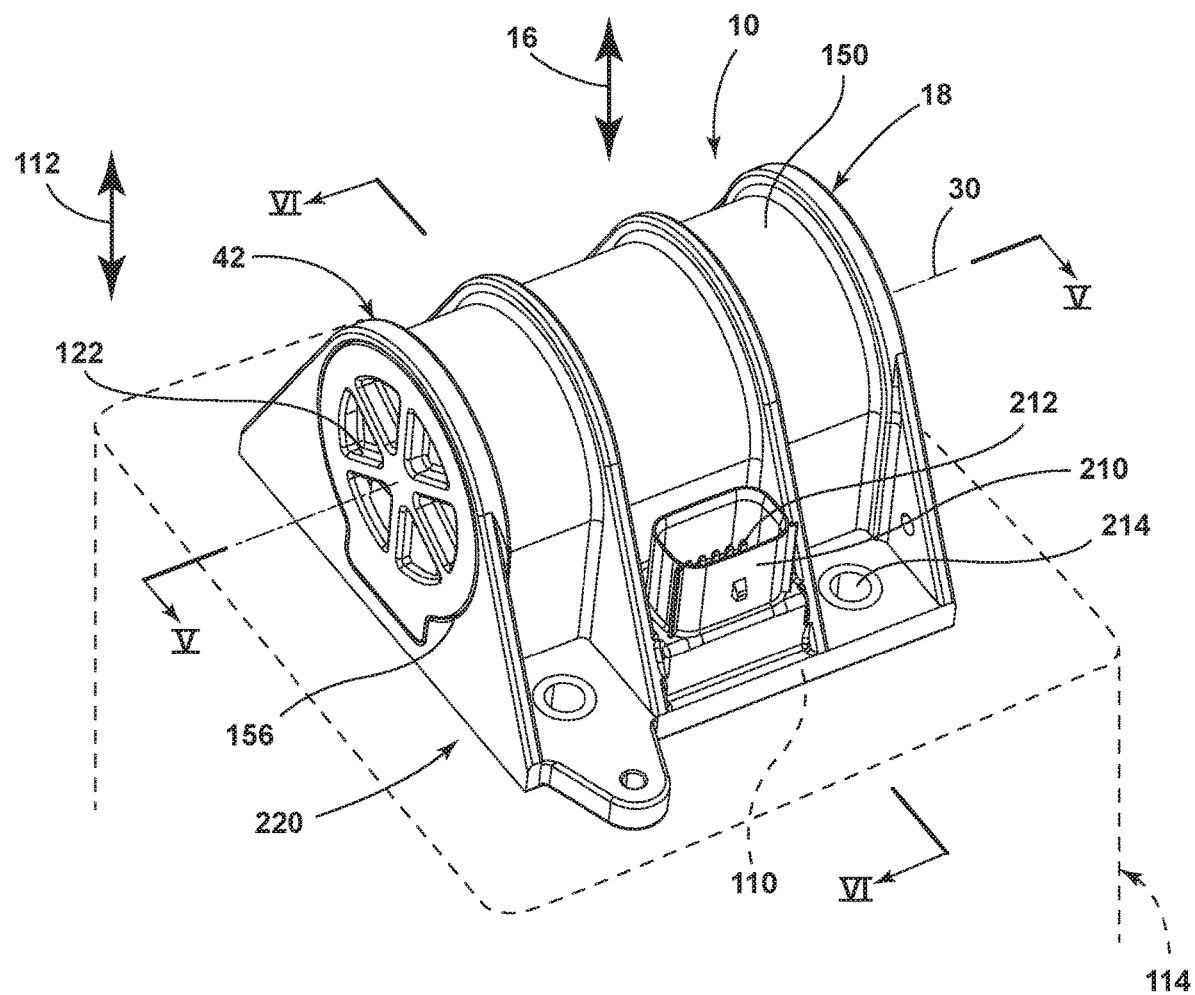
FIG. 1 is a side perspective view of an aspect of the circular force generator that incorporates the self-contained rotor-position sensor assembly.
Figure 2:
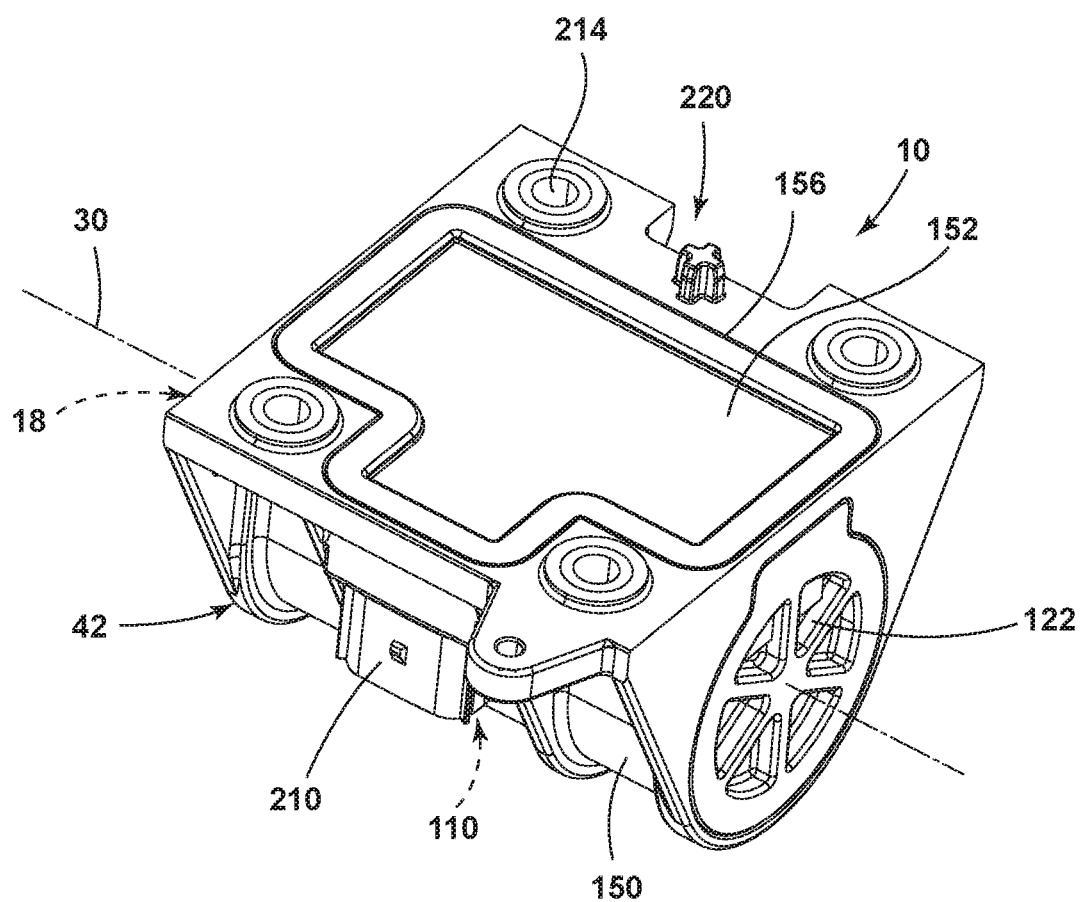
FIG. 2 is a second side perspective view of the circular force generator of FIG. 1.
Figure 3:
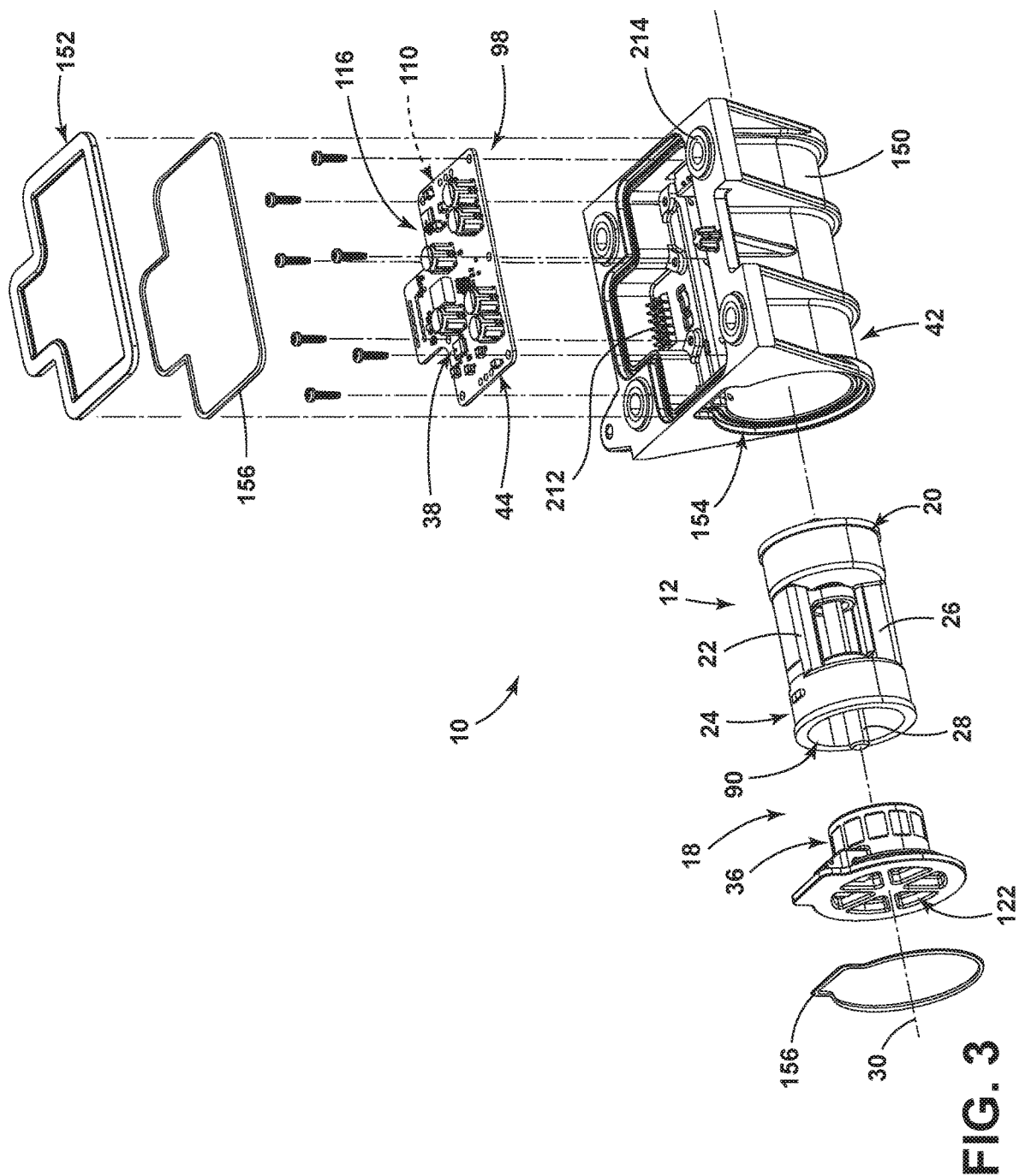
FIG. 3 is an exploded perspective view of the circular force generator of FIG. 2.
Figure 4:
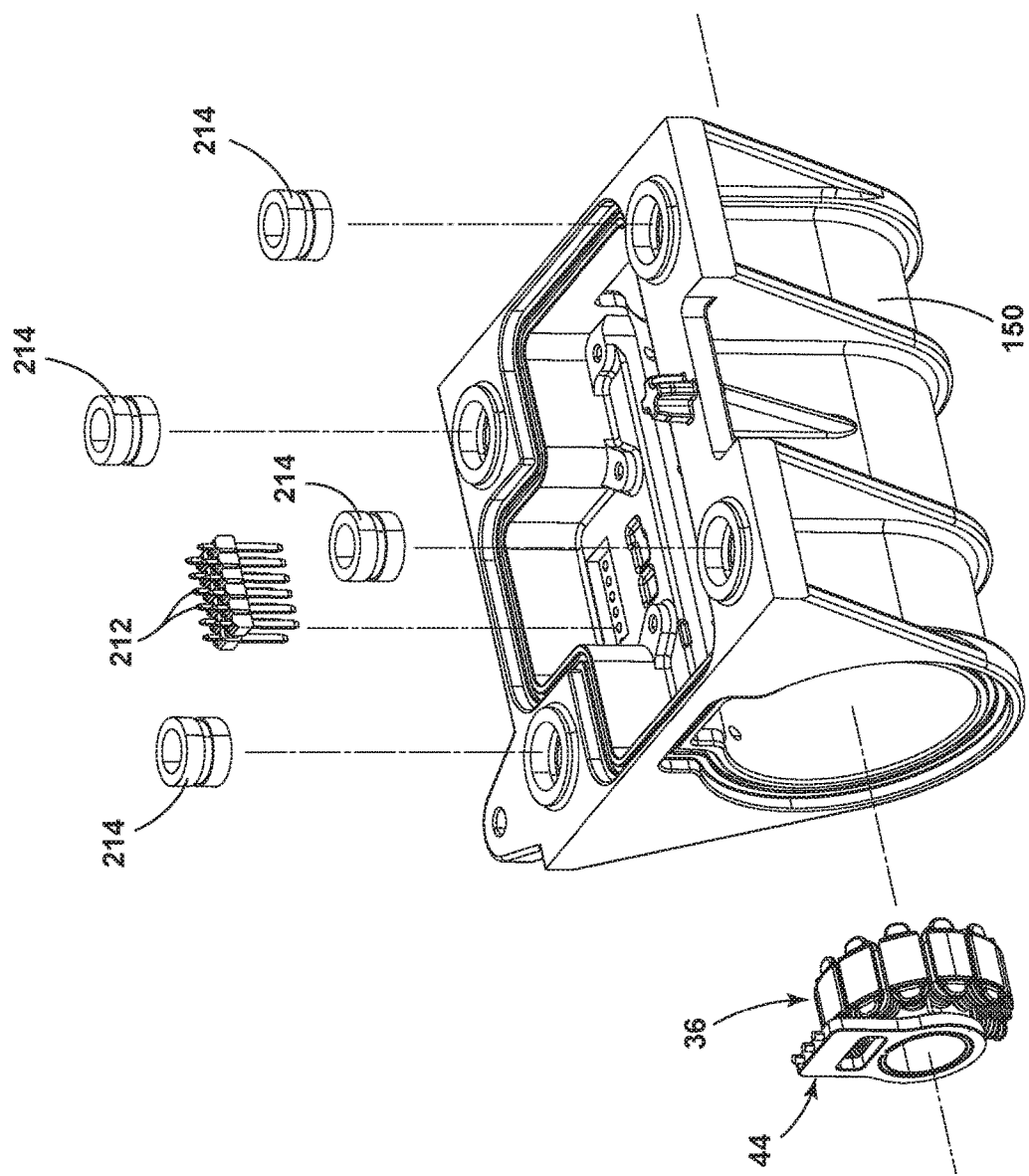
FIG. 4 is another exploded perspective view of the circular force generator of FIG. 2.
Figure 5:
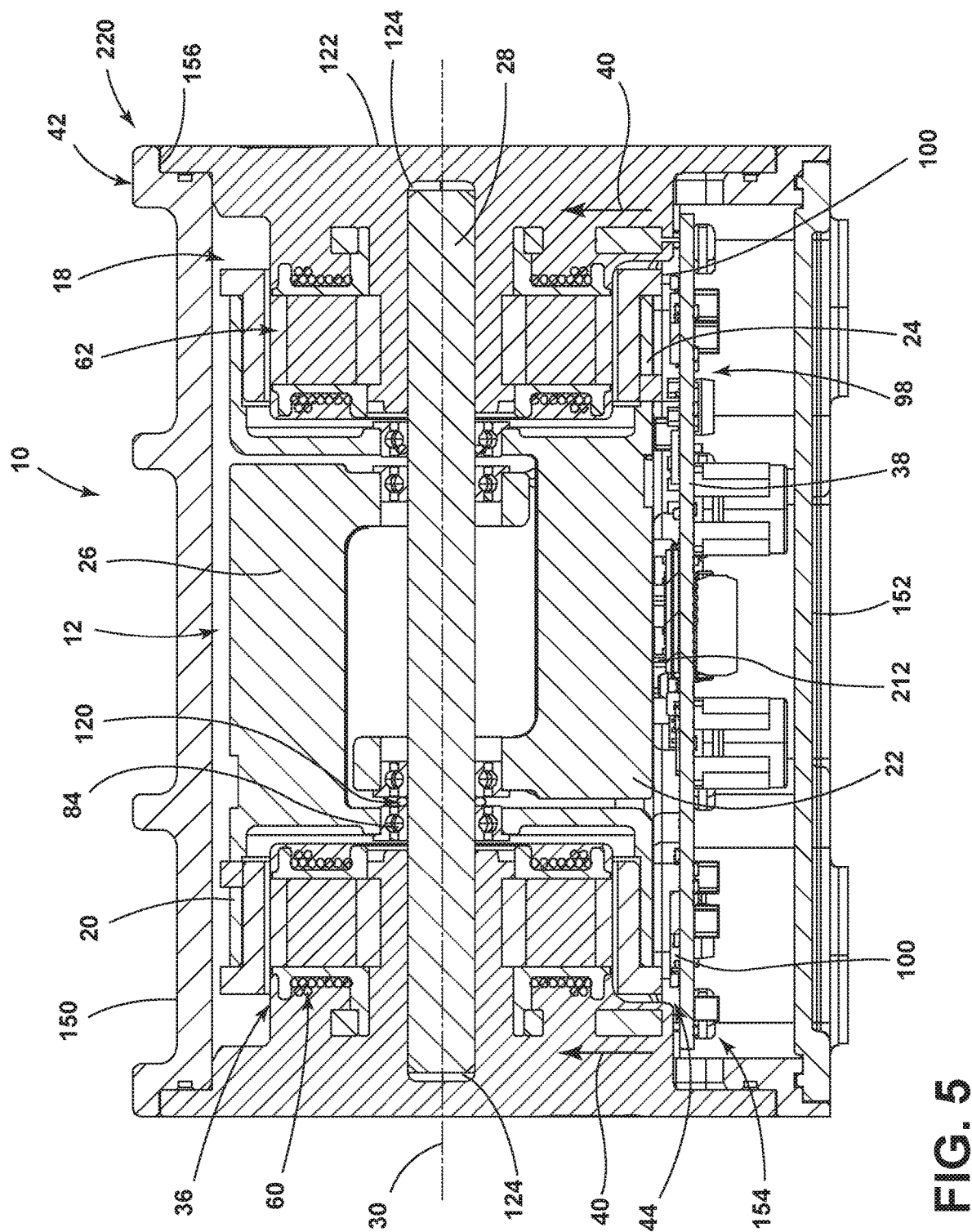
FIG. 5 is a cross-sectional view of the circular force generator of FIG. 1 taken along line V-V.
Figure 6:
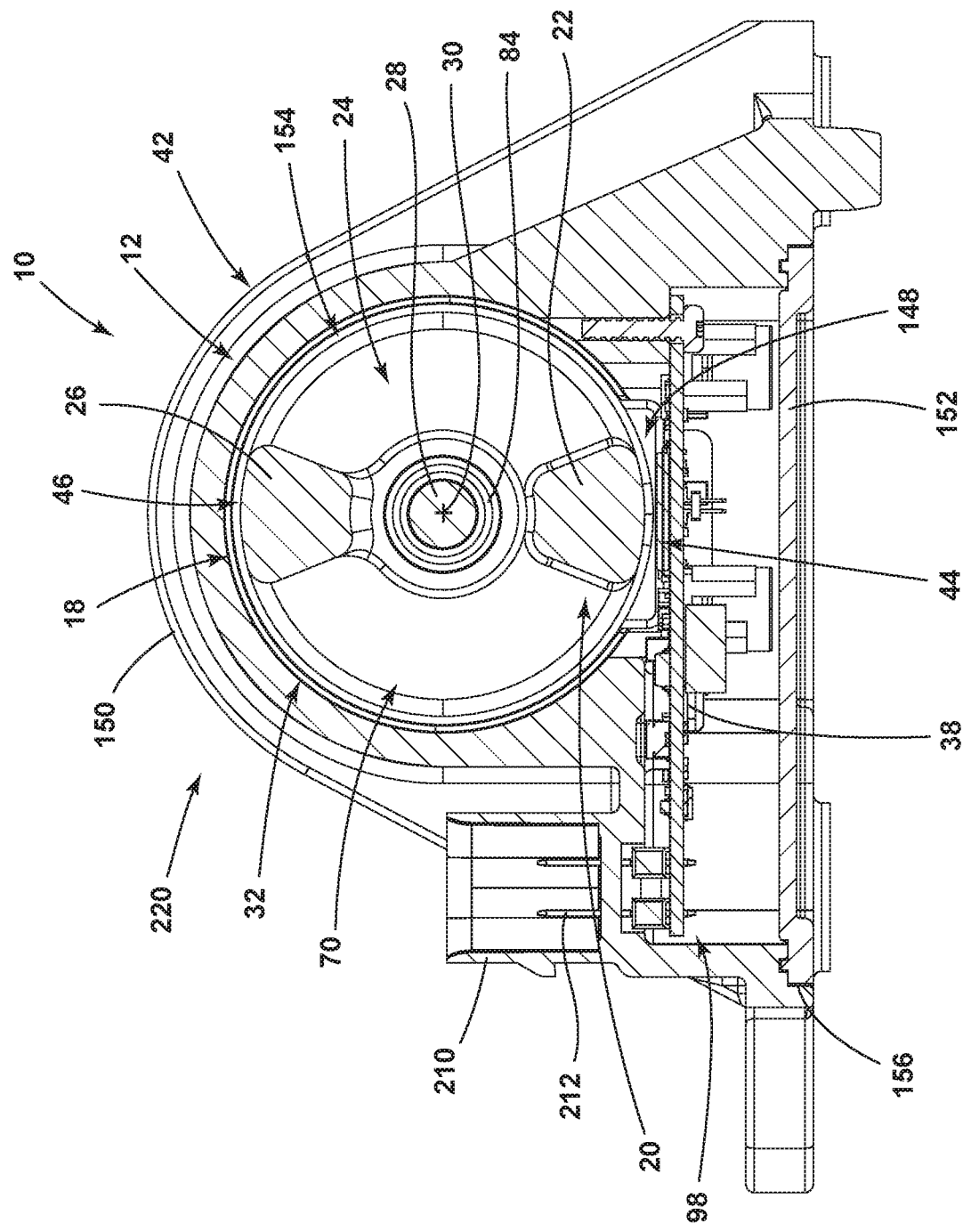
FIG. 6 is a cross-sectional view of the circular force generator of FIG. 1 taken along line VI-VI.
Figure 7:
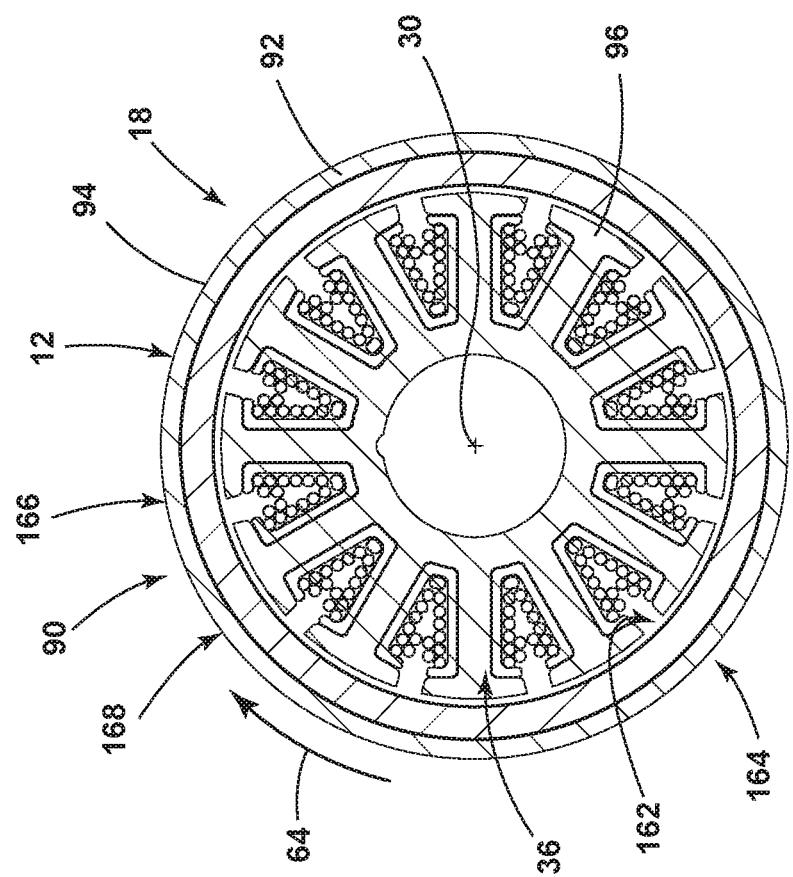
FIG. 7 is a cross-sectional view of one of the rotor and stator assemblies of the circular force generator of FIG. 5.
Figure 8:
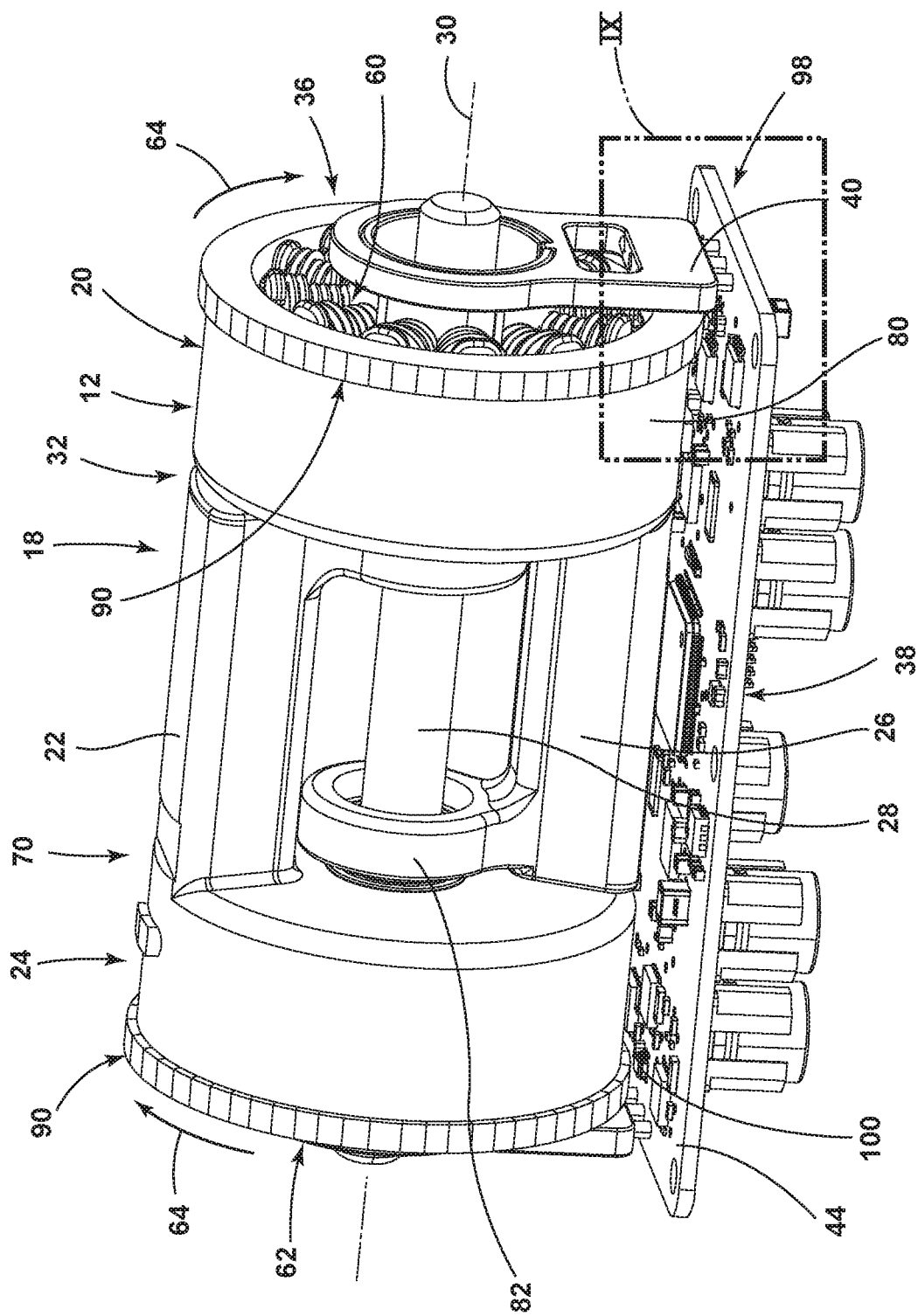
FIG. 8 is a perspective view of the circular force generator with portions of the outer housing removed.
Figure 9:
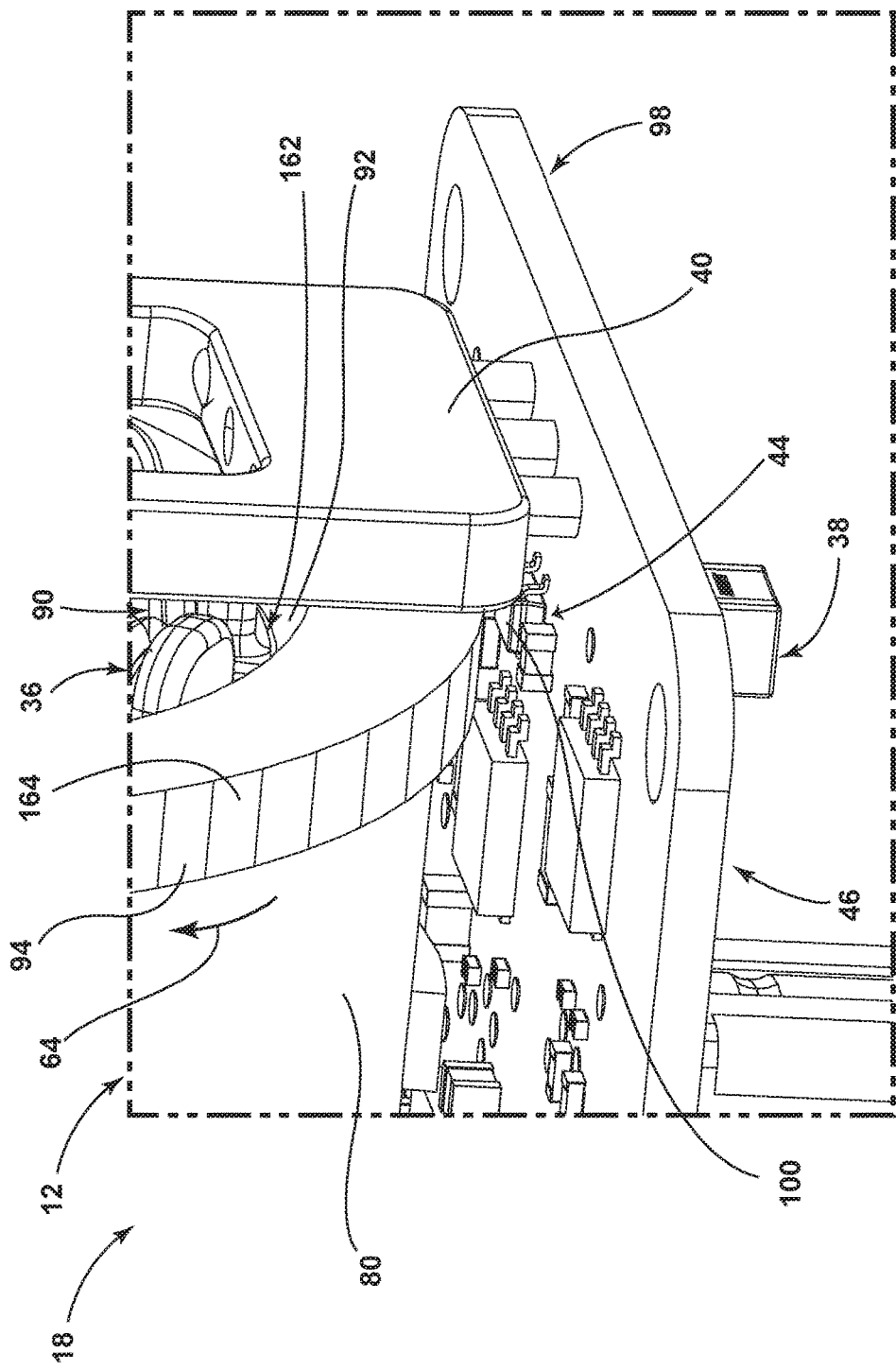
FIG. 9 is an exploded perspective view of the rotor-position sensor assembly for the circular force generator of FIG. 8, taken at area IX.
Figure 10:
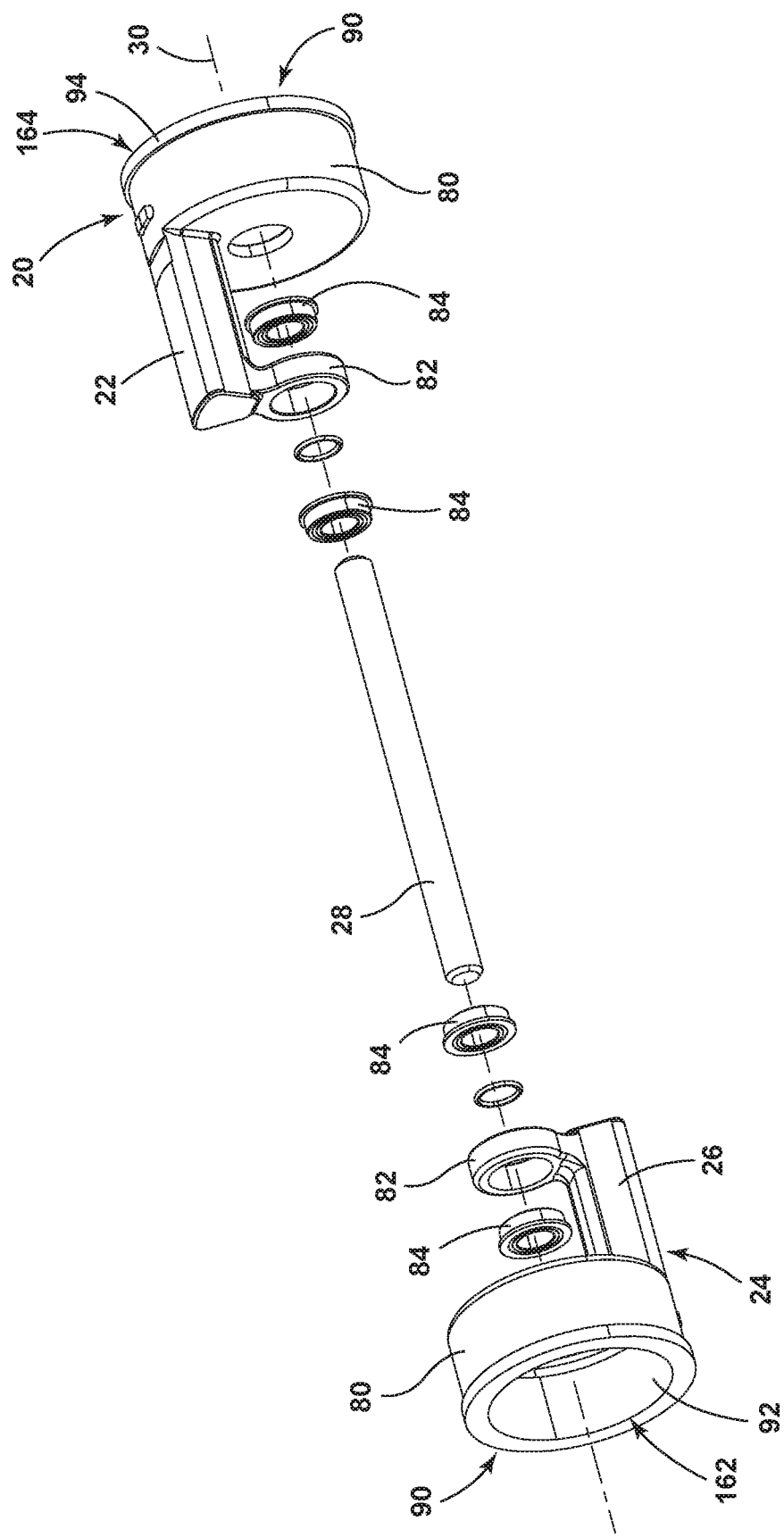
FIG. 10 is an exploded perspective view of the first and second rotor assemblies of the circular force generator of FIG. 8.
Figure 11:
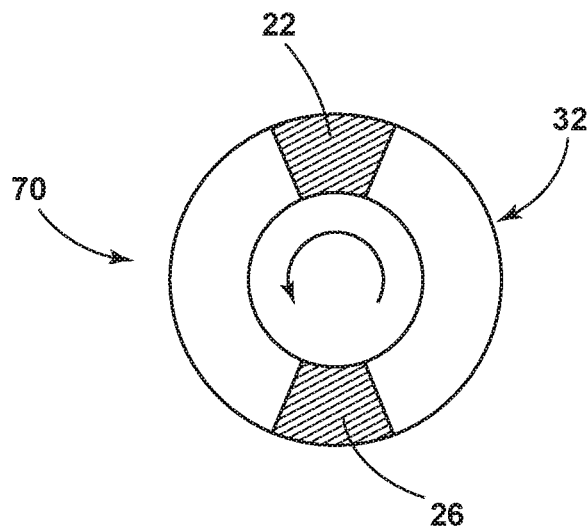
FIG. 11 is a schematic diagram illustrating the first and second rotors in a balanced position.
Figure 12:
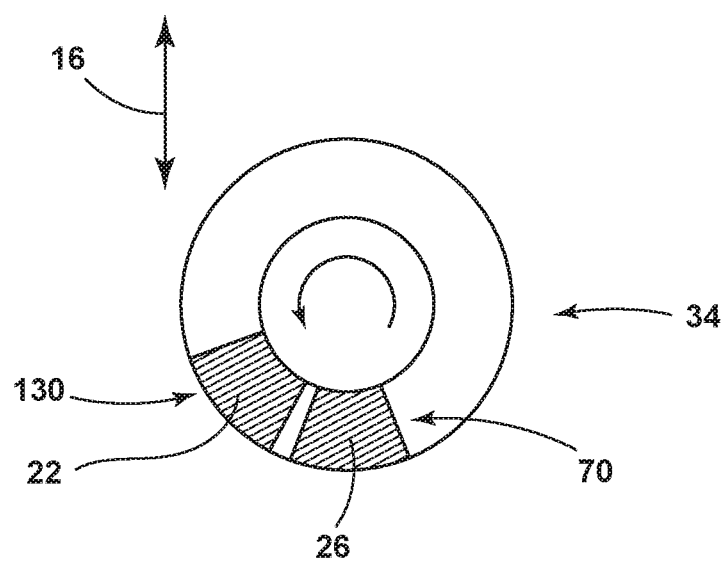
FIG. 12 is a schematic diagram illustrating the first and second rotors in an eccentric position that represents a maximum eccentric position.
Figure 13:
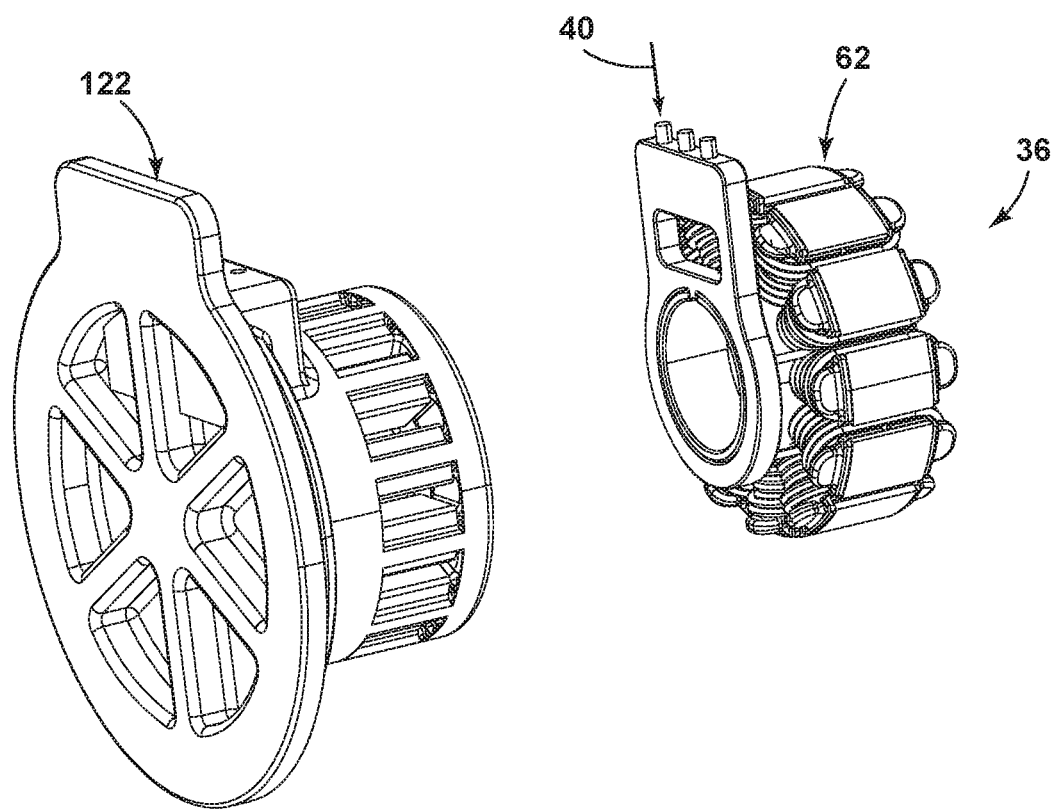
FIG. 13 is a partially-exploded perspective view of the end cap and one of the stators for the circular force generator.
Figure 14:
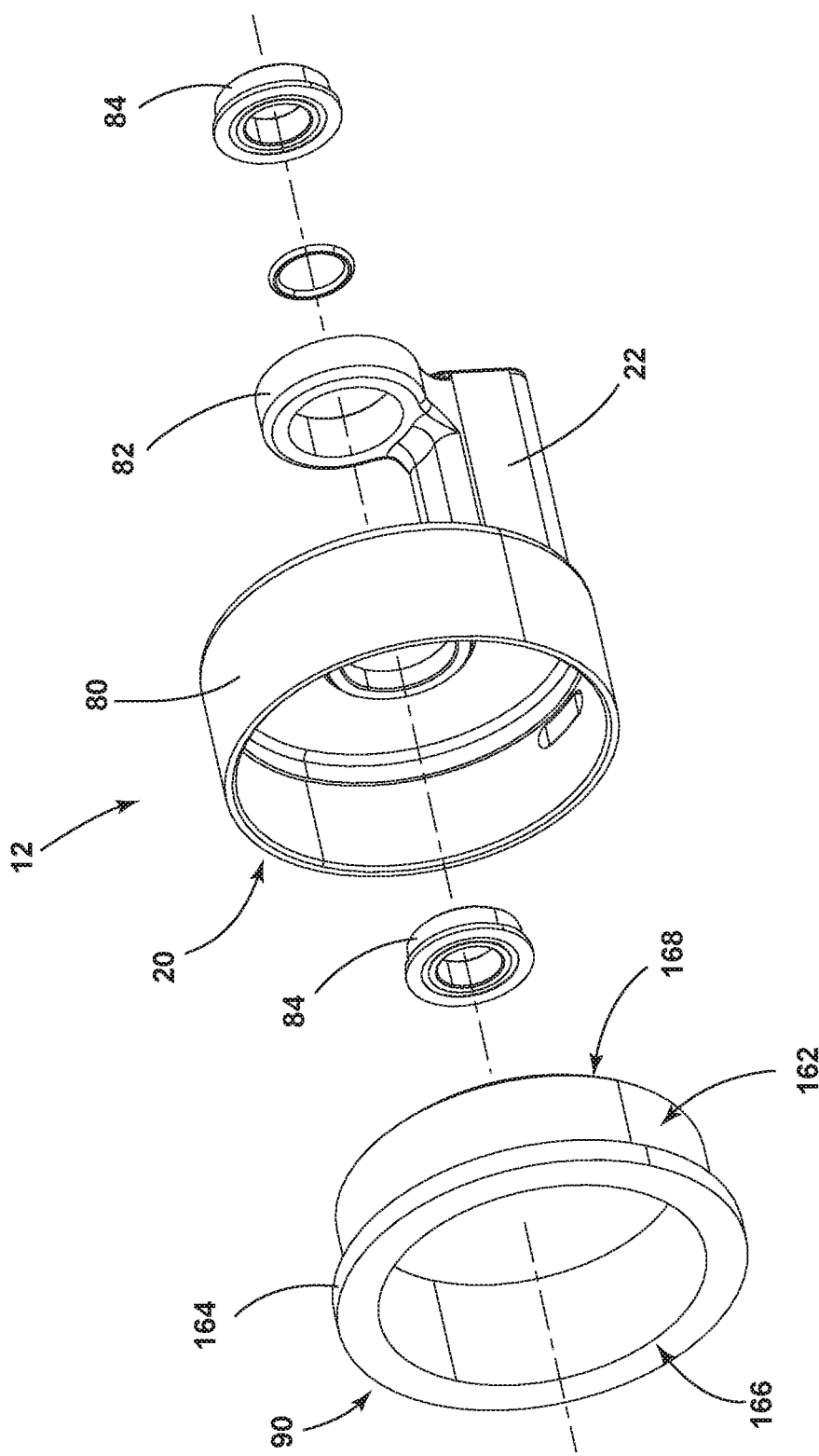
FIG. 14 is an exploded perspective view of one of the rotors for the circular force generator.
Figure 15:
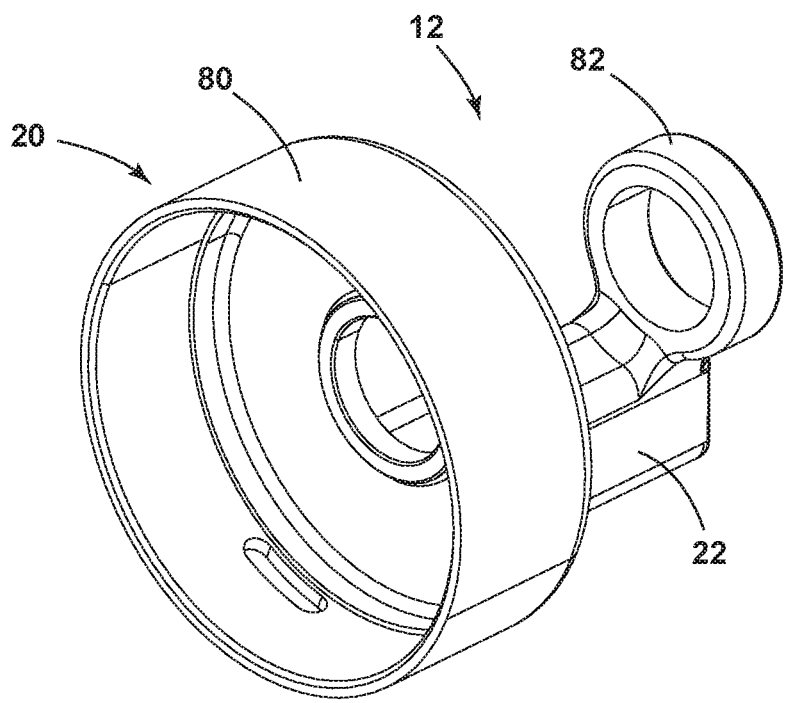
FIG. 15 is a perspective view of a rotor frame for one of the rotors of the circular force generator.
Figure 16:
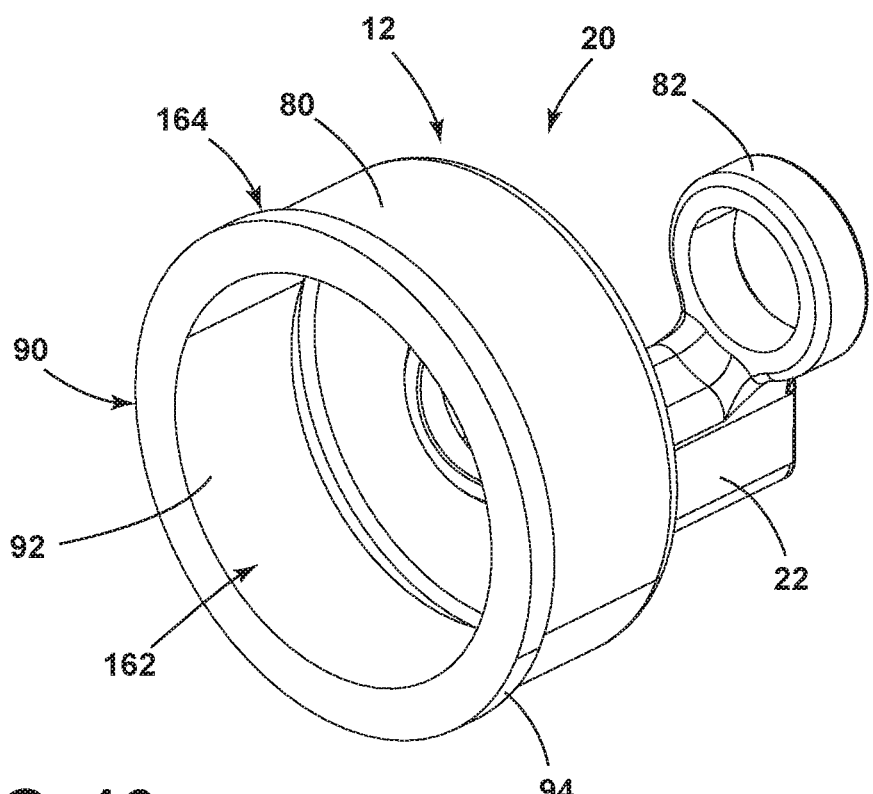
FIG. 16 is a perspective view of the rotor frame of FIG. 15 with the magnetic assembly added thereto.
Figure 17:
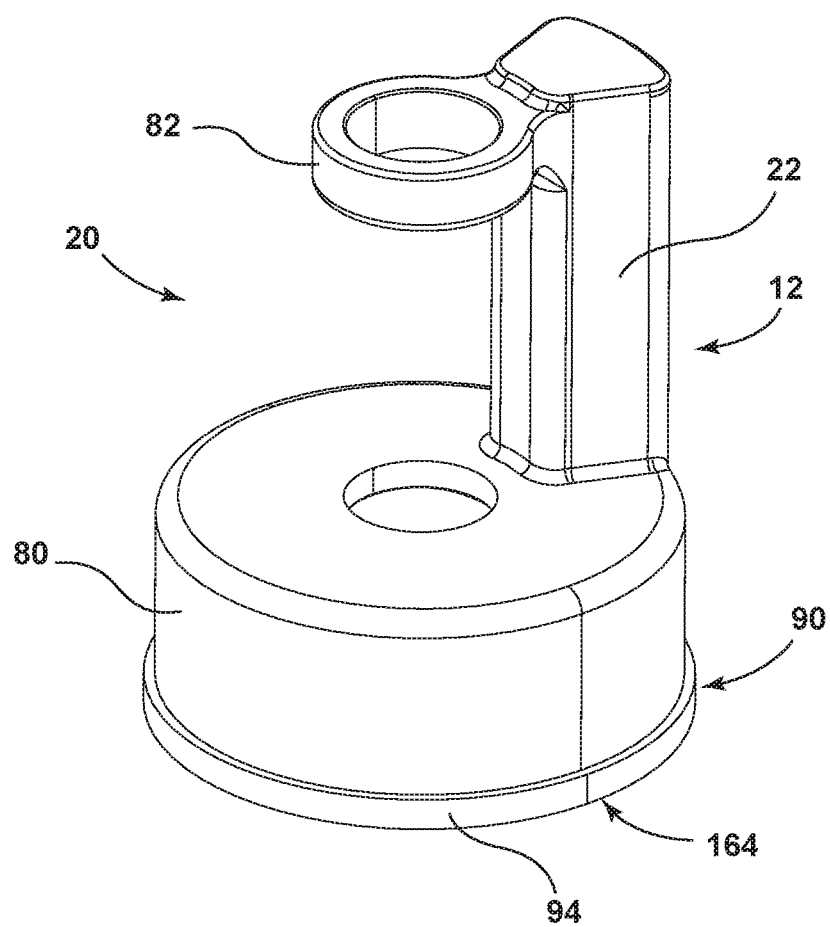
FIG. 17 is a second perspective view of the rotor frame and the magnetic assembly of FIG. 16.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-12, reference numeral 10 generally refers to a circular force generator, typically in the form of a vibration-cancelling module, that includes a plurality of rotors 12 for producing the various eccentric forces that act in opposition to undesirable wobble or vibrations within various mechanical assemblies. The circular force generator 10 is an anti-vibration module with integrated electronic controls for operating the plurality of rotors 12 in various positions relative to one another in order to produce the vibration canceling forces 16 described herein.

According to various aspects of the device, the circular force generator 10 includes a motor 18 having a first rotor 20 with a first eccentric body 22 and a second rotor 24 having a second eccentric body 26. A central shaft 28 extends between the first and second rotors 20, 24. The first and second rotors 20, 24 rotationally operate about a common rotational axis 30 with respect to one another and the central shaft 28. This rotational operation can be used to position the first and second eccentric bodies 22, 26 with respect to one another to define a balanced position 32 and a plurality of eccentric positions 34. A stator assembly 36 is in electromagnetic communication with first and second rotors 20, 24. A controller 38 delivers electrical current 40 to the stator assembly 36 and regulates the relative positions of the first and second rotors 20, 24 and the first and second eccentric bodies 22, 26. The first and second rotors 20, 24, the stator assembly 36 and the controller 38 are contained within a common housing 42.

According to various aspects of the device, the housing 42 also contains a rotor-position sensor assembly 44 that can be used to monitor the rotational positions 46 of the first and second rotors 20, 24 and the first and second eccentric bodies 22, 26 with respect to one another and also with respect to the stator assembly 36. While first and second rotors 20, 24 that cooperate respectively with first and second stators 60, 62 are disclosed, additional rotors 12 and stator assemblies 36 can be used such that the circular force generator 10 can include at least two motors 18, typically first and second motors that are positioned within the common housing 42. Each of these at least two motors 18 operate in relation to the central shaft 28, which is stationary with respect to the housing 42.

Referring again to FIGS. 1-10, the stator assembly 36 typically includes a first stator 60 that corresponds to the first rotor 20 and a second stator 62 that corresponds to the second rotor 24. In such an embodiment, the controller 38 delivers dedicated electrical current 40 to the first and second stators 60, 62 for operating, via electromotive force 64, each of the first and second rotors 20, 24. The electrical current 40 delivered to the first and second rotors 20, 24 can be used to rotate the first and second rotors 20, 24 and the first and second eccentric bodies 22, 26 at the same speed with respect to one another. When rotating at the same speed, the circular force generator 10 can be used to exert a consistent vibration canceling force 16 that is exerted in a direction generally perpendicular with the rotational axis 30 of the first and second rotors 20, 24.

The first and second stators 60, 62 can also be operated to receive the slightly different magnitude of electrical current 40. In such a situation, the differing electrical currents 40 that are delivered to the first and second stators 60, 62, can be used to modify the relative positions of the first and second rotors 20, 24 with respect to one another. This configuration, in turn, also modifies the relative eccentricity 70 of the first and second eccentric bodies 22, 26 with respect to one another. In this manner, the vibration canceling force 16 can be adjusted in magnitude by changing the relative eccentricity 70 of the first and second rotors 20, 24. The frequency of the vibration canceling force 16 can also be adjusted by increasing or decreasing the relative rotational speed, or radial spaced offsets, of the first and second rotors 20, 24 with respect to the first and second stators 60, 62.

As exemplified in FIGS. 8-12, the first and second rotors 20, 24 each include a magnet coupler 80 and a shaft coupler 82, where the corresponding eccentric body extends between the magnet coupler 80 and the shaft coupler 82. The central shaft 28 extends therethrough to allow for rotational operation of each of the first and second rotors 20, 24 about the rotational axis 30. In various aspects of the device, the central shaft 28 is a fixed member that is held in place by portions of the housing 42. The first and second rotors 20, 24 include a series of bearings 84 that allow for rotation of the first and second rotors 20, 24 about the central shaft 28. In this manner, the central shaft 28 delivers the vibration canceling force 16 from the first and second rotors 20, 24 and into the housing 42. The housing 42 is typically attached to a manifold or other structural component of the mechanism requiring the vibration canceling force 16 produced by the circular force generator 10. Additionally, multiple circular force generators 10 may be included within a particular mechanical device 114 to provide the vibration canceling force 16 in multiple directions and within multiple axial planes.

Referring again to FIGS. 8 and 12, during operation of the circular force generator 10, the first and second stators 60, 62 cooperate with the first and second rotors 20, 24 to produce an electromotive force 64 that rotates the first and second rotors 20, 24 about the central shaft 28. The dedicated magnet assemblies 90 that are coupled with the magnet coupler 80 of the first and second rotors 20, 24 include separate magnet sections. These sections include motor communication poles 92 and rotor position sensor poles 94. The motor communication poles 92 are representative of rotor magnets that cooperate with the stator poles 96 of the first and second stators 60, 62 to produce the electromotive force 64 that rotates the first and second rotors 20, 24 with respect to the central shaft 28. The rotor position sensor poles 94 extend outward from the magnet coupler 80 and interact with the rotor-position sensor assembly 44 that is coupled with a printed circuit board (PCB) 98 for the circular force generator 10. As the first and second rotors 20, 24 rotate about the central shaft 28, the rotor position sensor poles 94 interact with the rotor-position sensor assembly 44 to provide information regarding the rotational position 46 of the rotor 12. Each of the first and second rotors 20, 24 includes a dedicated positioning sensor 100 that interacts with the respective rotor position sensor poles 94 of the first and second rotors 20, 24. Accordingly, the dedicated positioning sensors 100 cooperate with the first and second rotors 20, 24 and with one another to provide information regarding the relative positions and relative eccentricity 70 of the first and second rotors 20, 24 with respect to one another. These relative eccentricities 70, as discussed above, are varied to produce varying magnitudes of the vibration canceling force 16. The dedicated positioning sensors 100 are coupled with a controller 38 of the PCB 98.

The controller 38 or other portion of the PCB 98 can include or can be connected with an external-force detection unit 110, typically in the form of one or more accelerometers (such as an imbalance accelerometer) located on the PCB 98. The external-force detection unit 110 includes an accelerometer assembly 116 that measures a magnitude and orientation of an external force 112, typically a vibration, or vibrational input, that may be produced by the mechanical device 114 that the circular force generator 10 is attached to. The controller 38 can cooperate with the external-force detection unit 110, and the dedicated positioning sensors 100 to adjust the electrical current 40 delivered to the first and second stators 60, 62. In this manner, the controller 38 operates to adjust the position of the first and second rotors 20, 24 relative to one another and also rotate the first and second rotors 20, 24 at an appropriate speed to counteract the external force 112 that is measured by the external-force detection unit 110. The controller 38 utilizes various algorithms and other software-related instructions to process information (i.e., vibrational inputs) from the external-force detection unit 110 and the dedicated positioning sensors 100 to control the operation of the first and second stators 60, 62.

During operation of the circular force generator 10, the external-force detection unit 110 measures the external force 112. This measurement of the external force 112 is delivered to the controller 38 and instructions and electrical current 40 are provided to the first and second stators 60, 62 for operating the first and second rotors 20, 24 to generate the vibration canceling force 16. The dedicated positioning sensors 100, typically in the form of Hall sensors, detect the rotational position 46 and rotational speed of each of the first and second rotors 20, 24. In this manner, the dedicated positioning sensors 100 provide information to the controller 38 regarding the rotational position 46 and rotational speed of each of the first and second rotors 20, 24. This information is provided so that the controller 38, if needed, can make adjustments in the provided electrical currents 40 so that the vibration canceling force 16 remains in substantially matching opposition to the external force 112. This matching opposition defines a counterbalancing relationship that mitigates and potentially cancels out the external force 112. During operation of the circular force generator 10, the external-force detection unit 110 and the dedicated positioning sensors 100 provide information to the controller 38 on a periodic or substantially continuous basis. The controller 38 utilizes this information to ensure that the vibration canceling force 16 remains in substantially counterbalanced opposition to the external force 112. In addition, and as will be described more fully below, the external-force detection unit 110 and the dedicated positioning sensors 100 are each located on the PCB 98 so that the circular force generator 10 including the controller 38 therefore, is a self-contained unit 220.

Referring now to FIGS. 3-10, the circular force generator 10 includes the outer housing 42 that contains the various components, both mechanical and electrical, for the circular force generator 10. Each of these components is contained within the housing 42 and can be utilized as a self-contained unit 220 for at least partially canceling the various vibration-type external forces 112 of mechanical assemblies. The circular force generator 10 includes the first and second stators 60, 62 that cooperate with first and second rotors 20, 24 to produce the electromotive force 64 that operates the first and second rotors 20, 24 about the central shaft 28. Each of the first and second rotors 20, 24 include dedicated bearings 84 that are coupled to the shaft coupler 82 and magnet coupler 80 for each of the first and second rotors 20, 24. To position the bearings 84, and in turn, the first and second rotors 20, 24, various compression rings 120 can be positioned between the bearings 84 to limit axial displacement of the first and second rotors 20, 24 along the central shaft 28 during operation of the circular force generator 10. These bearings 84, which can be in the form of common bearings 84, can be slip fit to the central shaft 28 so that each bearing 84 provides for smooth operation of each of the first and second rotors 20, 24. As discussed above, the central shaft 28 is fixed within the housing 42 and is coupled to an end cap 122 at a shaft mount 124 and may be molded to or otherwise attached to the outer housing 42 for the circular force generator 10.

The first and second stators 60, 62 are typically attached to or potentially molded within the outer housing 42 and the end cap 122. In this manner, the first and second stators 60, 62 can be placed in a secure and fixed position with respect to the circular force generator 10. The PCB 98 is fixed within the housing 42 and is positioned relative to the first and second rotors 20, 24. In particular, the PCB 98 includes the dedicated positioning sensors 100 that interact with the sensor portion 164 of the rotor magnets to provide information concerning the rotational position 46 of each of the first and second rotors 20, 24 in relation to the housing 42 and also in relation to one another.

During operation of the first and second rotors 20, 24, the first and second eccentric bodies 22, 26 rotate about the central shaft 28 to produce varying magnitudes of the vibration canceling force 16. As exemplified in FIG. 11, where the first and second eccentric bodies 22, 26 are positioned opposite to one another, rotation of first and second rotors 20, 24 produces a vibration canceling force 16 having a zero magnitude which is indicative of a balanced position 32. As the first and second eccentric bodies 22, 26 rotate with respect to one another about the central shaft 28, the relative eccentricity 70 of the first and second eccentric bodies 22, 26 increases. As exemplified in FIG. 12, a maximum relative eccentricity 130 of the first and second eccentric bodies 22, 26 is produced when the first and second eccentric bodies 22, 26 are positioned in an eccentric position 34 next to one another. In this configuration, rotation of the first and second rotors 20, 24 is able to produce a maximum magnitude of the vibration canceling force 16.

According to various aspects of the device, the frequency of the vibration canceling force 16 can be modified by varying the speeds at which the first and second rotors 20, 24 rotate about the central shaft 28. The magnitude of the vibration canceling force 16 can also be modified by changing the relative positions or relative eccentricity 70 of the first and second eccentric bodies 22, 26 with respect to one another. Accordingly, a high-magnitude vibration canceling force 16 can be produced with a low frequency, where the first and second eccentric bodies 22, 26 are positioned at the maximum relative eccentricity 130 represented in FIG. 12, and rotated slowly about the central shaft 28. If a change in magnitude of the vibration canceling force 16 is not desired, but a change in frequency is desired, the relative eccentricity 70 of the first and second eccentric bodies 22, 26 may change to produce a lesser relative eccentricity 70. When combined with a faster rotation, this relationship of the first and second eccentric bodies 22, 26 uses centrifugal force to maintain a consistent magnitude of the vibration canceling force 16. Consequently, this faster rotation also increases the frequency, and the first and second rotors 20, 24 may rotate about the central shaft 28 at a greater speed. Accordingly, by changing the relative eccentricity 70 of the first and second rotors 20, 24, paired with an increase in the speed of the first and second rotors 20, 24, a consistent vibration canceling force 16 can be exerted while only changing the frequency of the vibration canceling force 16. In this manner, a wide range of magnitudes and frequencies of the vibration canceling force 16 can be produced by modifying the relative eccentricity 70 of the first and second rotors 20, 24 and the speeds at which the first and second rotors 20, 24 rotate about the central shaft 28.

Referring now to FIGS. 13-19, the dedicated magnet assemblies 90 for the first and second rotors 20, 24 include the motor portion 162 and the sensor portion 164. As discussed above, the motor portion 162 of each dedicated magnet assembly 90 includes the motor communication poles 92 that interact with the respective first and second stators 60, 62 to produce the electromotive force 64 that operates the first and second rotors 20, 24 about the central shaft 28, respectively. Typically, the number of motor communication poles 92 within the motor portion 162 of each dedicated magnet assembly 90 will be (14). It should be understood that this number can vary depending upon the number of stator poles 96 and the number of motor communication poles 92 desired within a particular design for the circular force generator 10.

Referring again to FIGS. 13-19, the sensor portion 164 of the dedicated magnet assemblies 90 typically includes a greater number of rotor position sensor poles 94 that are positioned around the motor communication poles 92. In various aspects of the device, and as exemplified in FIG. 19, each dedicated magnet assembly 90 includes (62) rotor position sensor poles 94 that extend around the sensor portion 164 of each dedicated magnet assembly 90. This number of rotor position sensor poles 94 provides a certain degree of sensor definition and resolution with respect to the positioning of the first and second rotors 20, 24 and the first and second eccentric bodies 22, 26 with respect to one another. It should be understood that greater numbers of rotor position sensor poles 94 can be included within the sensor portion 164 of each dedicated magnet assembly 90. Greater numbers of rotor position sensor poles 94 may produce greater sensor definition and resolution with respect to the relative positions of the first and second rotors 20, 24. Accordingly, the magnetization process of each dedicated magnet assembly 90 of the first and second rotors 20, 24, can be customized for scalability with respect to the motor portion 162 and sensor portion 164 of each dedicated magnet assembly 90. Variations in the types of sensors, number of stator poles 96, changes in motor components and other variations can be accommodated during the magnetization process without changing the geometry of the structure of the first and second rotors 20, 24.

Figure 19:
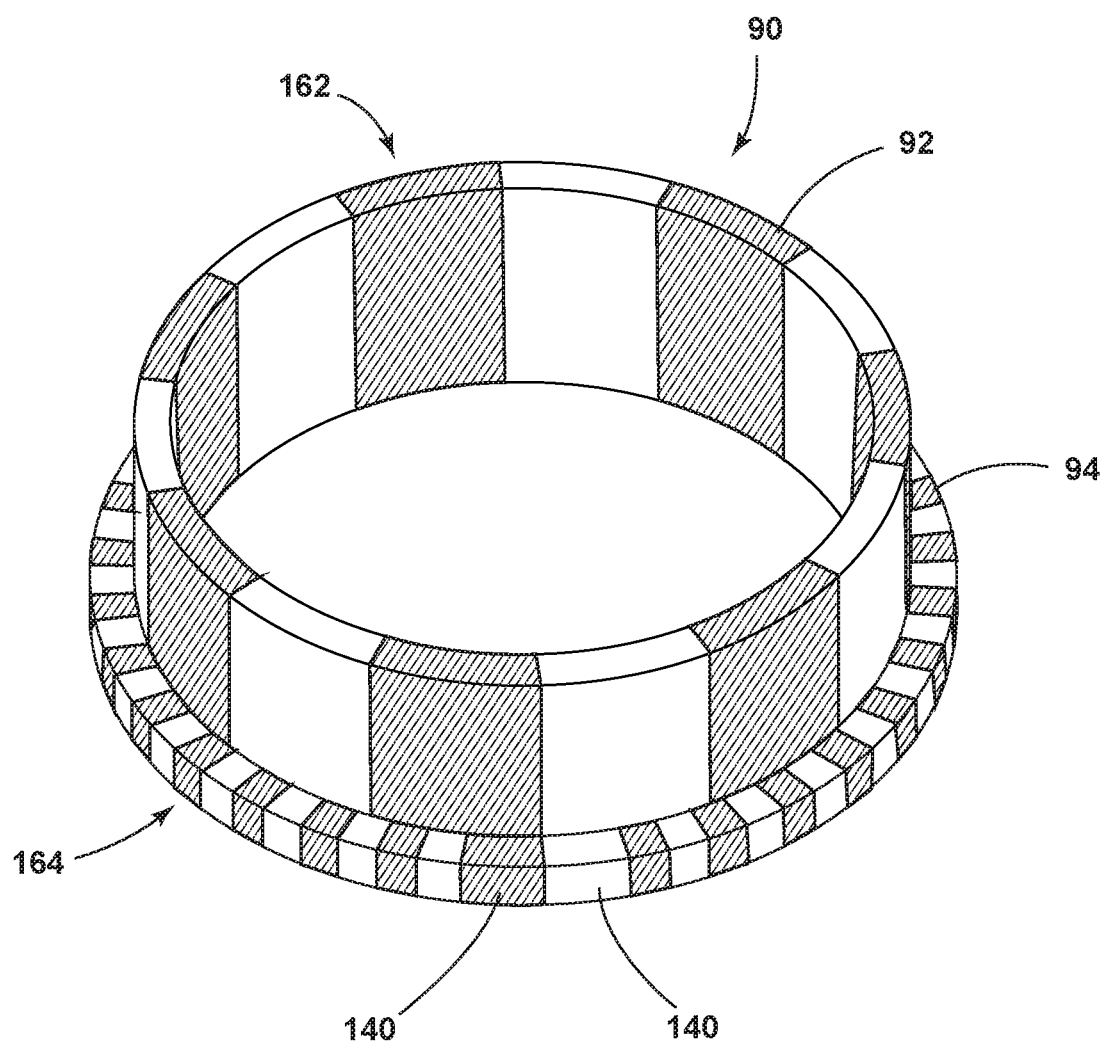
FIG. 19 is a schematic diagram illustrating the configuration of the motor communication poles and sensor poles for the magnetic material incorporated within the first and second rotors.

As exemplified in FIG. 19, the rotor position sensor poles 94 can include a pair of home position sensor poles 140. These home position sensor poles 140 can be configured to be larger than the remainder of the rotor position sensor poles 94 within the sensor portion 164 of each dedicated magnet assembly 90. These home position sensor poles 140 are configured to provide a specific magnetic signature for indicating the presence of the respective first and second eccentric bodies 22, 26 at the dedicated positioning sensor 100. The home position sensor poles 140 provide the specific magnetic signature that is different than the remainder of the rotor position sensor poles 94 when passing by the dedicated positioning sensor 100. This difference in the signal between the home position sensor poles 140 and the dedicated positioning sensor 100 may provide a signal that is indicative of the first and second rotors 20, 24 being in, or passing through a particular specific rotational position 46, such as the balanced position 32, of the respective rotor 12, or a home position 148 of each of the first and second rotors 20, 24, with respect to the first and second stators 60, 62.

As discussed above, the rotor-position sensor assembly 44, the PCB 98 and the controller 38 are all contained within the housing 42 for the circular force generator 10. The housing 42 can include a mold 150 as well as a PCB cover 152 that is attached and sealed to the mold 150. The PCB 98 can be located near the mechanical device 114 that generates the external force 112 so that the accelerometer of the external-force detection unit 110 that is located on the PCB 98 can be near to the mechanical device 114 for sensing the external force 112 that is to be cancelled. The PCB cover 152 helps to protect the PCB 98 from the exterior environment while also allowing for a close proximity between the mechanical device 114 and the accelerometer of the external-force detection unit 110. The mold 150 can be in the form of an overmold or a separately molded piece. The mold 150 can also be overmolded over a portion of the motor 18 and attached to other components of the motor 18. The end cap 122 can be used to enclose a motor cavity 154 that houses the first and second stator 60, 62 and the first and second rotors 20, 24, as well as the central shaft 28. When assembling the circular force generator 10, one of the stators of the first and second stators 60, 62 can be molded within the mold 150. The central shaft 28 may also be molded within the mold 150. The other components of the circular force generator 10 may then be slidably inserted within the motor cavity 154 for engaging with the central shaft 28. The opposing end cap 122 can then be secured to the mold 150 to enclose the motor cavity 154 and contain the various components of the circular force generator 10 therein. It is contemplated that the other stator of the first and second stators 60, 62 can be molded within the end cap 122, or may be attached thereto for securing within the motor cavity 154 when the end cap 122 is attached to the mold 150 of the housing 42.

Figure 18:
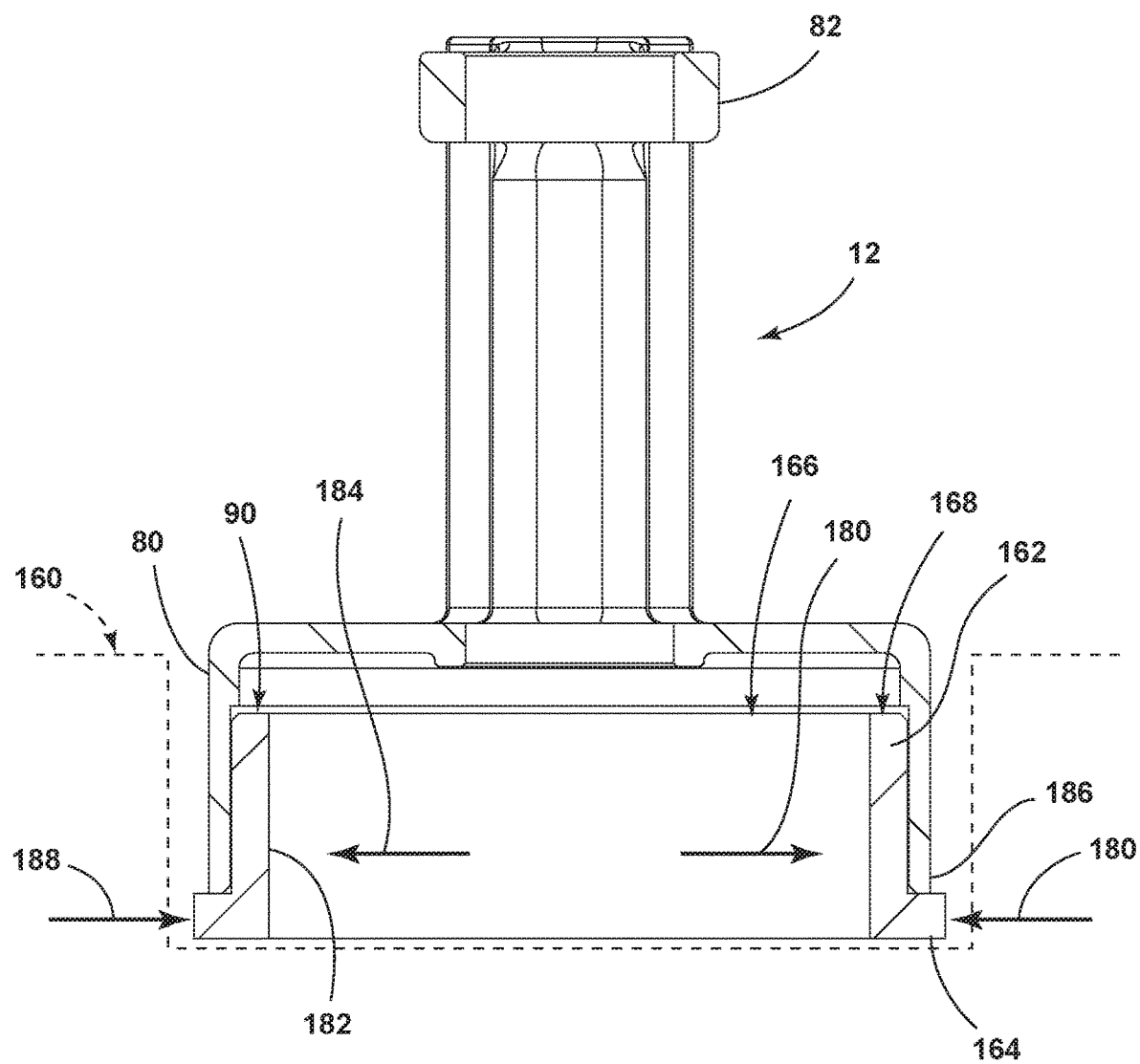
FIG. 18 is a schematic diagram illustrating a process for magnetizing the material of the rotor assembly.

As exemplified in FIGS. 18 and 19, the dedicated magnet assemblies 90 for the first and second rotors 20, 24 can be made of various magnetic materials. These magnetic materials can be in the form of permanent magnets, bonded or sintered neodymium, various other ferrous materials, and other magnetic materials.

To prevent infiltration of fluid, moisture, debris and other foreign matter, the housing 42 can include one or more sealing gaskets 156 that provide a sealed engagement between the end cap 122 with the mold 150 for the housing 42 and the engagement between the PCB cover 152 and the mold 150 for the housing 42.

As exemplified in FIG. 18, in certain aspects, bonded neodymium can be used as the magnetic material for each dedicated magnet assembly 90 for each of the first and second rotors 20, 24. In forming the motor and sensor portions 162, 164 of the dedicated magnet assemblies 90, the respective rotor 12 can be placed within a magnetizing fixture 160 in a fixed position within the magnetizing fixture 160. Within this magnetizing fixture 160, locations of both the motor communication poles 92 and the rotor position sensor poles 94 can be generated at the same time. The magnetic material of the dedicated magnet assemblies 90 is typically neodymian powder 166 that is mixed with a thermoplastic binder 168 that is injection molded onto the magnet coupler 80 for the rotor 12 to form the structure of each dedicated magnet assembly 90. Within the magnetizing fixture 160, the neodymian powder 166 is magnetized to simultaneously produce the motor communication poles 92 and the rotor position sensor poles 94 for each dedicated magnet assembly 90. This process produces consistent magnetization patterns of both the rotor position sensor poles 94 and the motor communication poles 92 relative to each of the first and second rotors 20, 24. This process also creates the highlighted sensor definition and resolution in the motor communication and rotor position sensor poles 92, 94 that increases the accuracy in using a particular control algorithm for operating the first and second rotors 20, 24 with respect to one another during operation of the circular force generator 10.

As exemplified in FIG. 18, to produce, simultaneously, the motor communication poles 92 and the rotor position sensor poles 94, the magnetization fixture produces the magnetization pattern in different directions. The motor communication poles 92 are typically interacting with the stator that is positioned inside of each dedicated magnet assembly 90 for the first and second rotors 20, 24. In this manner, the magnetization direction 180 of the motor portion 162 is directed in an outward direction 184, typically from the inside 182 of the magnet coupler 80. Conversely, the rotor position sensor poles 94 of each dedicated magnet assembly 90 typically interact with the various positioning sensors in an outward direction 184. Accordingly, the magnetization direction 180 of the sensor portion 164 for each dedicated magnet assembly 90 occurs in an inward direction 188, typically from the outside 186 of the magnet coupler 80. These opposing directions of the magnetization process produces, simultaneously, the motor communication poles 92 and the rotor position sensor poles 94 for each dedicated magnet assembly 90. This process can also produce a very precise and consistent pattern for both the motor communication poles 92 and the rotor position sensor poles 94, including the home position sensor poles 140 that are incorporated within the ring of rotor position sensor poles 94. In this manner, each of the motor communication poles 92 and rotor position sensor poles 94 can produce a high degree of sensor definition and resolution with respect to the speed and relative positions of the first and second rotors 20, 24 as they rotate about the central shaft 28.

To assist in the operation of the motor communication poles 92 and the rotor position sensor poles 94, each magnet coupler 80, as well as the respective shaft couplers 82, rotor back irons and first and second eccentric bodies 22, 26 of each rotor 20, 24, can be made of an integrally formed pieces of cast iron, such that each of the first and second rotors 20, 24 include a single unitary and integral piece of cast iron. This cast iron material can serve as dedicated rotor back irons of the magnet couplers 80 that function as magnetic shields for the dedicated positioning sensors 100. The motor portion 162 of each dedicated magnet assembly 90 is contained within the cast iron magnet coupler 80. The sensor portion 164 of each dedicated magnet assembly 90 extends at least partially outside of the magnet coupler 80. Accordingly, the cast iron magnet coupler 80 shields the dedicated positioning sensors 100 from interference from the motor portion 162 of each dedicated magnet assembly 90. This helps to ensure that the sensor definition and resolution provided by the precisely located sensor portion 164 of each dedicated magnet assembly 90 is not interfered with or diminished by the magnetic field of the motor portion 162 of each dedicated magnet assembly 90. In addition, because of the isolating function of the cast iron magnet coupler 80, the dedicated positioning sensors 100 can be in the form of a Hall Effect sensor. Hall Effect sensors are typically inexpensive and easy to manufacture. This configuration also assists in providing the magnetic interference isolation described above that results in accurate position readings and precise information resolution and precise motor control.

As discussed above, FIGS. 1-19 illustrate an exemplary number of motor communication poles 92 and rotor position sensor poles 94. It should be understood that the number of motor communication poles 92 and rotor position sensor poles 94 can vary depending upon the configuration of the particular stator, the design of the mechanical device 114 requiring the vibration cancelling force, the configuration of the circular force generator 10, the size of the circular force generator 10, and other similar considerations.

As exemplified in FIGS. 1-6, the circular force generator 10 can include an external connector 210 for receiving data connections and electrical connections for communicating various information and delivering electrical current 40 to the circular force generator 10. Additionally, data concerning the vibration for which the vibration canceling force 16 is exerted can also be delivered into the circular force generator 10. The external connector 210 can also be used to link multiple circular force generators 10 to allow for cooperative operation. This cooperative operation can be used to produce a greater variation in the direction, frequency, magnitude and amplitude of the canceling force 16.

Various terminals 212 can be included within the connector and extend to the PCB 98 and the controller 38. Various collars 214 can be included for attaching the housing 42 to a particular structure of the mechanical device 114 or near the mechanical device 114. The plurality of terminals 212 can be positioned in a symmetrical and co-planar configuration and orientation to provide a single connection plane between the two motors 18 and the PCB 98. The symmetrical orientation of the PCB 98 and the motors 18 allows for a diminished strain on the PCB 98. The symmetry of the PCB 98 and the motors 18 also allows for a centralized location of the at least one accelerometer of the external-force detection unit 110 of the PCB 98 which results in more accurate feedback. The controller 38 can include a shared or common microcontroller that controls the operation of the at least two (typically two) motor drivers for the motors 18. Accordingly, the single microcontroller allows for independent operation of each motor 18 for producing the vibration canceling force 16.

Figure 20:
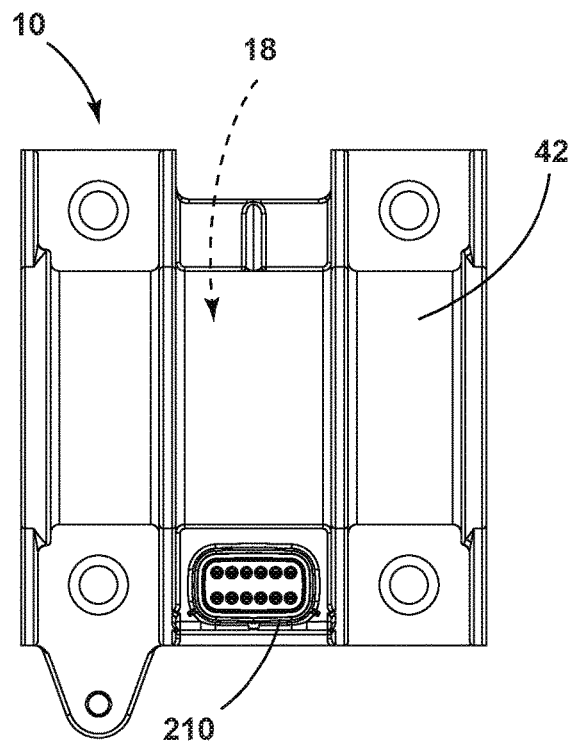
FIG. 20 is a first elevational view of an exemplary aspect of the circular force generator incorporating a rotor-position sensor assembly within a housing.
Figure 21:
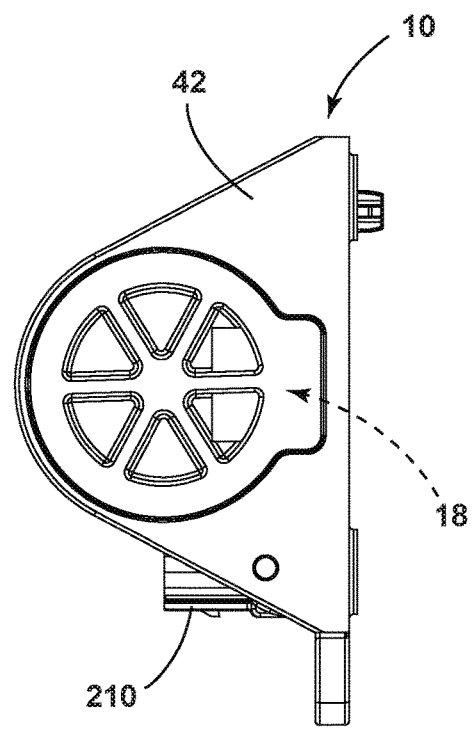
FIG. 21 is a second elevational view of the circular force generator of FIG. 20.
Figure 22:
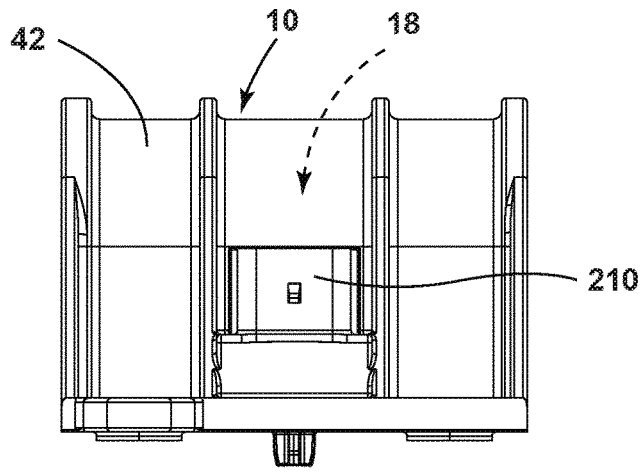
FIG. 22 is a third elevational view of the circular force generator of FIG. 20.

As exemplified in FIGS. 20-22, an exemplary aspect of the circular force generator 10 is described. These images reflect a particular size and configuration of the circular force generator 10 that can be utilized for producing the vibration canceling force 16. It should be understood that a wide range of sizes and configurations of the circular force generator 10 can be included. Each of these configurations is intended to include a self-contained unit 220 that includes the first and second stators 60, 62, the first and second rotors 20, 24, and the various components of the controller 38 and PCB 98 that are all self-contained within the housing 42 for the circular force generator 10. This circular force generator 10, being a self-contained unit 220, can be used as a plug-and-play device, having integrated, on-board controls, that can be attached to a mechanical assembly for providing the vibration canceling force 16 thereto.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vibration-cancelling module comprising:
    a first rotor having a first eccentric body;
    a second rotor having a second eccentric body;
    a stator assembly in electromagnetic communication with the first and second rotors;
    a central shaft that extends between the first and second rotors, wherein the first and second rotors rotationally operate about a common rotational axis with respect to one another between a balanced position and a plurality of eccentric positions;
    a controller having an accelerometer assembly and a rotor position sensor assembly, wherein the controller delivers an electrical current to the stator assembly at least based upon the accelerometer assembly; and
    a common housing that contains the first and second rotors, the stator assembly, the central shaft and the controller, wherein each of the first and second rotors includes a dedicated magnetic assembly, wherein each dedicated magnetic assembly includes motor communication poles that are in electromagnetic communication with the stator assembly and rotor position sensor poles that are in electromagnetic communication with the rotor position sensor assembly.

2. The vibration-cancelling module of claim 1, wherein the controller receives vibrational inputs from the accelerometer assembly and delivers the electrical current to the stator assembly based upon the vibrational inputs.

3. The vibration-cancelling module of claim 1, wherein the accelerometer assembly and the rotor position sensor assembly are positioned on a printed circuit board that is contained within the common housing, wherein a cover is attached to the common housing to enclose the printed circuit board within the common housing.

4. The vibration-cancelling module of claim 1, wherein the rotor position sensor poles include a home position pole that identifies a specific rotational position of the rotor position sensor poles with respect to the rotor position sensor assembly.

5. The vibration-cancelling module of claim 1, wherein the stator assembly includes first and second stators that correspond to the first and second rotors, wherein the first and second stators are operated by a common microcontroller.

6. The vibration-cancelling module of claim 1, wherein the first and second rotors each include respective rotor back irons that are made of cast iron.

7. The vibration-cancelling module of claim 6, wherein the first rotor, the first eccentric body and the first rotor back iron are formed as an integral piece, and wherein the second rotor, the second eccentric body and the second rotor back iron are formed as an integral piece.

8. The vibration-cancelling module of claim 1, further comprising:
    an end cap that is secured to the common housing, wherein the end cap includes the stator assembly that at least partially seals a motor cavity of the common housing, and wherein the end cap includes a shaft mount for securing the central shaft and at least a portion of the stator assembly to the common housing.

9. The vibration-cancelling module of claim 3, further comprising:
    an electrical and data connector that includes a plurality of terminals, wherein the plurality of terminals are positioned in a symmetrical and co-planar orientation that defines a single connection plane between the stator assembly and the printed circuit board.

10. The vibration-cancelling module of claim 3, wherein the printed circuit board and the stator assembly are positioned in a symmetrical orientation that reduces strain on the printed circuit board.

11. An anti-vibration module having integrated electronic controls, the anti-vibration module comprising:
    at least two motors positioned within a housing and having respective rotor masses, wherein the at least two motors selectively operate to define radial speed offsets that further define a counterbalance;
    an integral controller that is positioned within the housing and in operational communication with the at least two motors, wherein the controller comprises:
        an imbalance accelerometer that senses vibrational inputs from a source to be counteracted; and
        a rotor position assembly that monitors rotation of the at least two motors and cooperates with the controller and the imbalance accelerometer to define the radial speed offsets of the respective rotor masses, wherein the at least two motors selectively operate in cooperation with the rotor position assembly and the imbalance accelerometer to define the counterbalance, wherein each of the rotor masses includes a magnetic assembly that includes motor communication poles and rotor position sensor poles, wherein the rotor position sensor poles include a home position that is defined during a magnetization process that contemporaneously defines locations of the motor communication poles and the rotor position sensor poles, including the home position of the rotor position sensor poles.

12. The anti-vibration module of claim 11, further comprising:
    a central shaft that is rotationally fixed with respect to the housing, wherein the at least two motors each rotationally operate about the central shaft, and wherein the at least two motors include two motors having two respective rotor masses, and wherein the two motors include common bearings that are slip fit to the central shaft, wherein the common bearings cooperatively operate with each of the two motors.

13. The anti-vibration module of claim 11, wherein the controller is part of a PCB, wherein the PCB is shielded from an exterior environment by a PCB cover, wherein the PCB cover further shields the PCB and the controller from a unit generating the sensed vibrational inputs.

14. The anti-vibration module of claim 13, further comprising:
    an electrical and data connector that includes a plurality of terminals, wherein the plurality of terminals are positioned in a symmetrical and co-planar orientation that defines a single connection plane between the at least two motors and the PCB.

15. The anti-vibration module of claim 13, wherein the PCB and the at least two motors are positioned in a symmetrical orientation, wherein the symmetrical orientation reduces strain on the PCB, wherein the PCB includes at least one accelerometer that is centrally positioned on the PCB to provide precise feedback and greater sensory definition.

16. A vibration-cancelling module comprising:
   a first motor positioned within a common housing and having a first eccentric body;
   a second motor positioned within the common housing and having a second eccentric body, wherein the first and second motors selectively operate to define a vibration cancelling force; and
   a controller having an accelerometer assembly and a rotor position sensor assembly positioned on a printed circuit board, wherein:
      the controller and the printed circuit board are each positioned within the common housing;
      the controller delivers an electrical current to a stator assembly at least based upon the accelerometer assembly and the rotor position sensor assembly to define the vibration cancelling force;
      each of the first and second eccentric bodies includes a dedicated magnetic assembly;
      each dedicated magnetic assembly includes motor communication poles that are in electromagnetic communication with the first and second motors, respectively;
      each dedicated magnetic assembly includes rotor position sensor poles that are in electromagnetic communication with the rotor position sensor assembly; and
      the rotor position sensor poles include a home position pole that identifies a specific rotational position of the rotor position sensor poles with respect to the rotor position sensor assembly.

17. The vibration-cancelling module of claim 16, wherein a cover is attached to the common housing to enclose the controller and the printed circuit board within the common housing, and wherein a sealing gasket is positioned between the cover and the common housing to define a sealed engagement between the cover and the common housing.

18. The vibration-cancelling module of claim 16, wherein the controller receives vibrational inputs from the accelerometer assembly and delivers the electrical current to the stator assembly based upon the vibrational inputs.

19. The vibration-cancelling module of claim 16, further comprising:
   an electrical and data connector that includes a plurality of terminals, wherein the plurality of terminals are positioned in a symmetrical and co-planar orientation that defines a single connection plane between the first and second motors and the printed circuit board.

20. The vibration-cancelling module of claim 16, wherein the stator assembly includes first and second stators that correspond to the first and second motors, wherein the first and second stators are operated by a common microcontroller.

* * * * *